May 2, 1972   G. A. ROGERS   3,660,280
DIALYSIS APPARATUS

Filed April 23, 1969   2 Sheets-Sheet 1

INVENTOR
George A. Rogers

BY De Lio and Montgomery
ATTORNEYS

INVENTOR
George A. Rogers

BY Dedio and Montgomery
ATTORNEYS

United States Patent Office 3,660,280
Patented May 2, 1972

3,660,280
DIALYSIS APPARATUS
George A. Rogers, Crewe, England, assignor to Calmic Engineering Company Limited, Crewe, England
Filed Apr. 23, 1969, Ser. No. 818,649
Claims priority, application Great Britain, Apr. 25, 1968, 19,761/68
Int. Cl. B01d 31/00, 13/00
U.S. Cl. 210—22
11 Claims

ABSTRACT OF THE DISCLOSURE

A dialysis system for removing toxic substances from the blood, provided with a dialysis membrane in the form of a semi-permeable flat member and a flat envelope within which the flat member is situated, and including a flexible lattice.

This invention relates to improvements in artificial kidneys.

An artificial kidney is an apparatus in which the circulating blood of a patient is subjected to dialysis extracorporeally. Such an apparatus can remove non-protein nitrogen and other toxic substances from the blood and is generally used where there is suppression of kidney function in the patient. An essential part of an artificial kidney is thus a dialysis system.

In many of the known forms of dialysis system for use in artificial kidneys, a dialysis membrane consisting of two "lay flat" tubes made of viscose cellulose is provided. The two tubes are wound in parallel about the surface of a cylinder to form two coils. The turns of the coils are separated by a P.V.C. coated glass filament mesh held apart at the edges by extruded P.V.C. spacer strips. These spacer strips have transverse flutes indented in one side to allow an easy passage for the dialysing liquid. This is enclosed within a P.V.C. envelope which is tightly collapsed around the coils when in use. The envelope is provided with two narrow tubes, one at the bottom for inflow of dialysing liquid and one at the top for outflow of dialysing liquid.

In operation of an artificial kidney incorporating this known form of dialysis system, arterial blood from the patient is passed through the two "lay flat" tubes, usually by means of a pump. At the same time, dialysing liquid is passed into the inlet tube of the envelope, the direction of flow of the dialysing liquid being at right angles to the direction of flow of the blood.

Toxic substances are removed from the blood into the dialysing fluid by dialysis. The blood then passes from the coils and into venous stream of the patient. The spent dialysing liquid passes out to waste through the outflow tube of the envelope.

It has now been found that when a dialysis system, using a semipermeable flat tube of the type employed in the coiled structures described above but in which the general direction of flow of the dialysing liquid is either countercurrent to or concurrent with the general direction of flow of blood and in which efficacious conditions of turbulence in the dialysing liquid are produced, is incorporated into a kidney machine, then the flow characteristics so achieved give rise to a very effective removal of toxic substances from the blood. Moreover, it has been found that, by incorporation of a particular form of flexible lattice in contact with the flat tube dialysis membrane, conditions of turbulence are produced in the dialysing liquid to an extent which most effectively provides more uniform dialysis over the whole surface of the flat tube dialysis membrane.

Thus, according to the present invention, in one aspect, there is provided a dialysis system for removing toxic substances from the blood comprising a dialysis membrane in the form of a semi-permeable flat tube, and a flat envelope within which the tube is situated, each of the two inside walls of the envelope being separated from the adjacent outside wall of the tube by a flexible lattice, comprising a first set of parallel members affixed to and at an angular disposition to a second set of parallel members, the lattice being in contact with the adjacent outside wall of the tube.

The dialysis system of the present invention has a number of particular advantages over known systems. Thus, a dialysis unit, as described hereinafter, incorporating a dialysis system of the present invention is very simple in construction enabling reductions in cost and space to be made and its assembly to be performed easily and readily. Further, such a unit can be disposable. Also, when the dialysis system is incorporated into a dialysis unit in the form of a coil, as described hereinafter, then the coiled dialysis unit may be emptied with great ease. Thus, when dialysis is complete, the coiled dialysis unit may be unwound, for example, from a spool, and blood flows into the venous stream of the patient without appreciable loss of blood to the patient. Also, when such a unit is incorporated into an artificial kidney it has surprisingly been found that a pump is not essential in the blood inlet line and that the unit functions satisfactorily without a pump.

In the dialysis system of the present invention, the dialysis membrane is conveniently in the form of a "lay flat" tube made of viscose cellulose and the flat envelope is conveniently made of a plastic material such as P.V.C. The lattice is conveniently made of a plastic material such as nylon, polypropylene or other similar material, though in practice nylon is the preferred material because of its greater rigidity which provides for better support of the dialysis membrane and better contact with the dialysis membrane. Also, the first set of parallel members in the flexible lattice is in a different, but adjacent, plane from the second set of parallel members.

It is to be noted that the flexible lattice is of a precise, regular and determined structure, in particular when compared with the mesh employed in many of the known forms of dialysis system, as described above. Moreover, the spacing of the lattice members is wider than the spacing in the above mentioned mesh, advantageous results being obtained, for example, when the distance between successive members of the lattice is about 3 mm., though this distance may be greater, for example, from about 3 mm. to about 12 mm. The pattern of the lattice may, for example, be rhomboidal and each of the lattice members may be approximately circular in cross-section, a typical diameter in such a case being about 1 mm.

In operation of the dialysis system of the present invention, blood from the patient flows in the semi-permeable flat tube and dialysing liquid flows in the envelope, the general direction of flow of the dialysing liquid being either countercurrent to or concurrent with the general direction of flow of blood. Particularly advantageous results are obtained when the flow of blood and of dialysing liquid are countercurrent with respect to each other. Thus, the present invention also provides a method of removing toxic substances from blood by dialysis, which comprises passing arterial blood inside a dialysis membrane in the form of a semi-permeable flat tube, which is situated within a flat envelope, each of the two inside walls of the envelope being separated from the adjacent outside wall of the tube by a flexible lattice as defined above, and passing dialysing liquid outside the tube but within the envelope and through the spaces between the members of the lattice.

3

In a further aspect of the present invention there is provided a dialysis unit comprising a dialysis system as defined above, the semi-permeable flat tube and the flat envelope each being provided with an inlet and an outlet at their respective ends, the flat envelope being flexible so that the dialysis unit is capable of being wound into a coil. Such a coil may, for example, be wound into a spool. In operation blood is passed through the flat tube and dialysing fluid is passed through the flat envelope either in the same direction as the blood flow or in an opposite direction to the blood flow.

Another form of dialysis unit according to the present invention comprises a dialysis membrane in the form of two semi-permeable flat tubes and a flat envelope, provided with an inlet at one end and an outlet at the other end, within which envelope the two tubes are situated side by side, each of the two inside walls of the envelope being separated from the adjacent outside walls of the tubes by a flexible lattice as defined above, which is in contact with the adjacent outside walls of the tubes, one end of one of the tubes having an inlet and the adjacent end of the other tube having an outlet, the ends of the tubes opposite the inlet and the outlet being connected. This form of dialysis unit is preferred as the resistance to the flow of dialysing liquid is lessened by the flat envelope having a larger cross-section area.

According to the present invention in a still further aspect, there is provided an artificial kidney which incorporates a dialysis unit as defined above, in combination with a number of items which are known to those skilled in the field of artificial kidneys. The inlet of the dialysis membrane is connected by a blood inlet line to the arterial stream of the patent and the outlet of the dialysis membrane to a blood outflow line connected to the venous stream of the patient. A pump may be incorporated in the blood inlet line, but thhis is not essential (see above). A venous bubble trap is generally provided in the bood outflow line. The inlet tube of the flat envelope of the dialysis unit is connected by a pipe to a reservoir containing dialysing liquid, the pipe optionally incorporating a flowmeter and a constraint to control the flow of dialysis unit is provided with a pipe for the passage of waste being separated from the adjacent outside walls of the a flowmeter and a constraint to control the flow of dialysing liquid. The outlet tube of the flat envelope of the dialysis unit is provided with a pipe for the passage of waste dialysing liquid.

It has generally been found in the artificial kidney of the present invention that a pressure of about 3 feet of water is sufficient to pass dialysing liquid through the dialysing liquid through the dialysis unit at a rate of 500 ml./minute when the rate of passage of blood is about 150 ml./minute.

The invention will now be described with particular reference to the accompanying drawings in which FIG. 1 is a plan view of a dialysis system;

Figure 1:
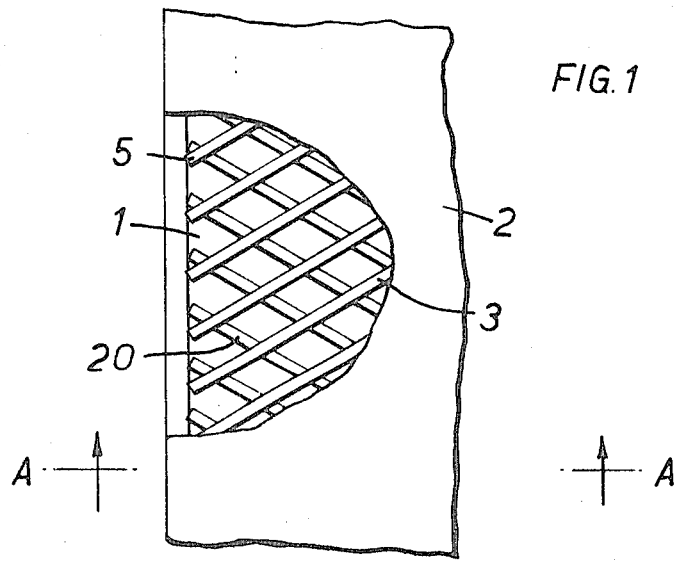
Figure 2:
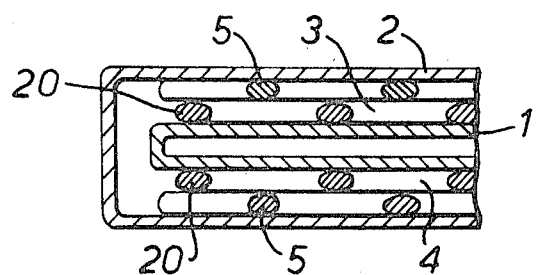
FIG. 2 is a cross-section of FIG. 1 about the line A—A.

Referring to FIGS. 1 and 2, in both of which the proportions have been exaggerated to show the detail more clearly, a semi-permeable flat tube 1 amde of viscose cellulose is situated in a flat envelope 2 made of P.V.C. A lattice 3 made of nylon, polypropylene or other similar material is situated between the upper side of the flat tube 1 and the envelope 2 and a similar lattice 4 is situated between the lower side of the flat tube 1 and the envelope 2. Each lattice 3 and 4 is of a regular rhomboidal pattern and consists of a set of parallel members 5 affixed to a second set of parallel members. The first set 5 is in a different but adjacent plane from the second set 20. The distance between successive members of each lattice 3 and 4 is about 3 mm. and the diameter of the lattice members is about 1 mm. Both lattices 3 and 4 are in touching contact with the flat tube 1 and the envelope 2.

Figure 3:
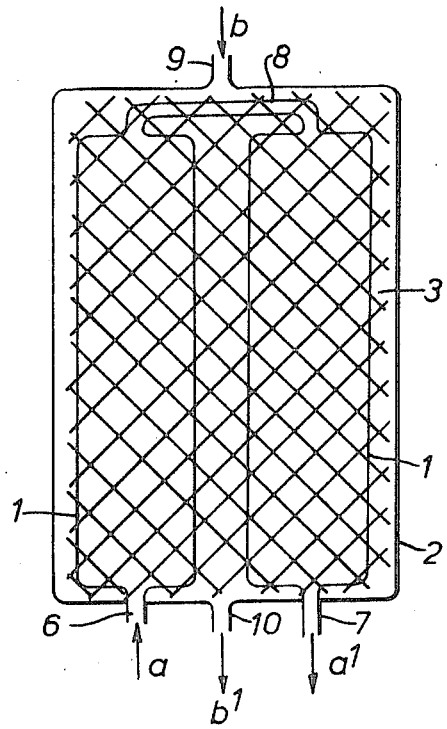
FIG. 3 is a plan view of a dailysis unit incorporating a dialysis system.

Referring to FIG. 3, two similar flat tubes 1 are situated side by side in a flat envelope 2, the left hand tube having a narrow inlet tube 6 and the right hand flat tube 1 having a narrow outlet tube 7. The two flat tubes 1 are joined at their adjacent ends by a narrow connecting tube 8. The envelope 2 is provided with an inlet 9 and an outlet 10. The lattice 3 is positioned between the upper sides of the flat tubes 1 and the envelope 2 and a second lattice (not shown) is positioned between the lower side of the flat tubes 1 and the envelope 2. The dimensions of a typical flat tube are length 6096.1 mm. and width 44 mm. giving a total surface area of 1.082 sq. m. in a dialysis unit described above.

Before use the dialysis unit 10 is appropriately sterilised by chemical means, or conveniently by irradiation, for example, X-rays or gamma-rays.

Figure 4:
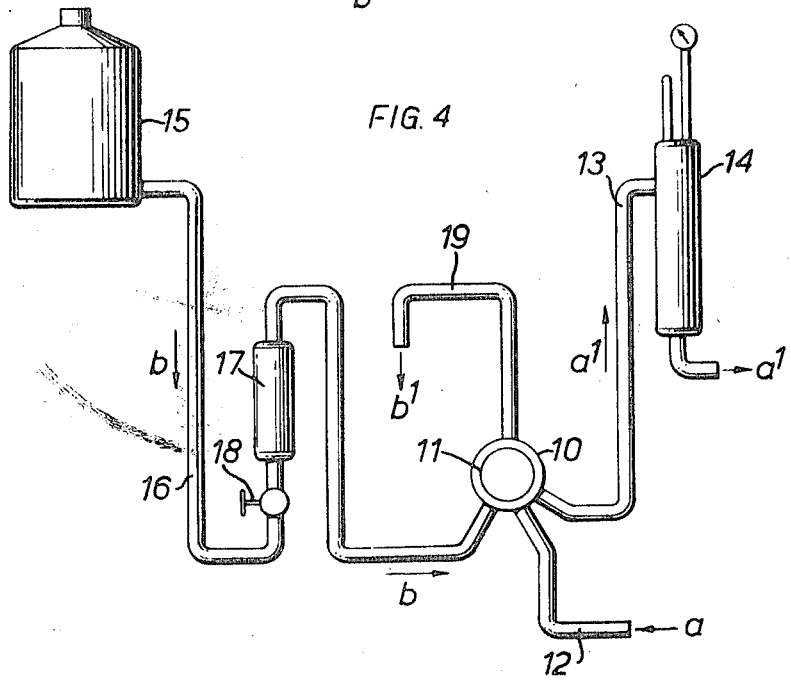
FIG. 4 is a plan view of an artificial kidney showing the dialysis unit wound into a coil.

Referring to FIG. 4 and also to FIG. 3, the dialysis unit 10 is wound onto a spool 11. The inlet tube 6 of the dialysis unit 10 is connected by a pipe 12 to the arterial blood supply of the patient. A second pipe 13 connects the outlet tube 7 of the dialysis unit 10 to a venous blood trap 14 and thence to the venous blood supply of the patient. A dialysiing liquid reservoir 15 is connected to the inlet 9 of the envelope 2 of the dialysis unit 10 by a pipe 16 in which a flowmeter 17 and a clip for controlling flow are provided. A further pipe 19 passes from the out- In operation of the artificial kidney, blood passes from the arterial supply of the patient along the pipe 12 and through the flat tubes 1 of the dialysis unit 10 in the direction shown by the arrows $a$. Simultaneously, dialysing liquid is passed from the reservoir 15 along the pipe 16 and through the envelope 2 in the direction shown by the arrows $b$. The blood then passes from the dialysis unit 10 and along the pipe 13 via the venous blood trap and thence to the venous blood supply of the patient as shown by the arrows $a'$. Dialysing liquid passes from the envelope 2 via the pipe 19 to waste as shown by the arrows $b'$.

At the conclusion of dialysis, the unit 10 is unwound so that the blood in the unit may flow into the patient's blood stream.

What is claimed is:

1. A coiled dialysis unit for removing toxic substances from the blood, which comprises a flexible dialysis membrane in the form of a semi-permeable flat tube, and a flexible substantially impermeable flat envelope within which the tube is situated, each of the two inside walls of the envelope being separated from the adjacent outside wall of the tube by a flexible lattice, said lattice comprising a first set of parallel members affixed to and at an angular disposition to a second set of parallel members, the lattice being in contact with the adjacent outside wall of the tube and the inside wall of said flat envelope.

2. A dialysis unit according to claim 1 wherein the semi-permeable flat tube and the flat envelope are each provided with an inlet and an outlet at their respective ends, the flat envelope being flexible so that the dialysis unit is capable of being wound into a coil.

3. A dialysis unit according to claim 2 wherein the dialysis membrane is made of viscose cellulose.

4. A dialysis unit according to claim 1 wherein the dialysis membrane is made of viscose cellulose and the flexible lattice is made of nylon.

5. A dialysis unit comprising a dialysis membrane in the form of two semi-permeable flat tubes, and a flat envelope provided with an inlet at one end and an outlet at the other end, within which envelope the two tubes are situated side by side, each of the two inside walls of the envelope being separated from the adjacent outside walls of the tubes by a flexible lattice which is in contact with the adjacent outside walls of the tubes, one end of one of the tubes having an inlet and the adjacent end of the other tube having an outlet, the ends of the tubes opposite to the inlet and the outlet being connected by said lattice comprising a first set of parallel members affixed to and at an angular disposition to a second set of parallel members.

6. A dialysis unit according to claim 5 wherein the flexible lattice is made of nylon.

7. A dialysis unit according to claim 6 wherein the distance between successive members of the flexible lattice is about 3 mm.

8. A dialysis unit according to claim 7 wherein the pattern of the flexible lattice is rhomboidal.

9. A dialysis unit according to claim 5 wherein the dialysis membrane is made of viscose cellulose.

10. A method of removing toxic substances from blood by dialysis, which comprises passing arterial blood inside a flexible dialysis membrane in the form of a coiled semi-permeable flat tube, which is situated within a coiled flexible substantially impermeable flat envelope, each of the two inside walls of the envelope being separated from the adjacent outside wall of the tube by a flexible lattice and passing dialysing liquid outside the tube but within the enevolpe and through the spaces between the members of the lattice, said lattice comprising a first set of parallel members affixed to and at an angular disposition to a second set of parallel members, the lattice being in contact with the adjacent outside wall of the tube and the inside wall of said flat envelope.

11. A method according to claim 10 wherein the general direction of flow of blood is countercurrent to the general direction of flow of the dialysing liquid.

References Cited

UNITED STATES PATENTS

| | | | |
|---|---|---|---|
| 2,664,395 | 12/1953 | Marchand | 210—321 |
| 2,683,117 | 7/1954 | Rosehak et al. | 210—321 |
| 2,687,997 | 8/1954 | Marchand | 210—321 |
| 2,880,501 | 4/1959 | Metz | 210—321 X |
| 3,490,523 | 1/1970 | Esmond | 210—321 X |
| 3,510,004 | 5/1970 | Hoeltzenbein | 210—321 |
| 3,508,662 | 4/1970 | Miller | 210—321 |
| 3,516,548 | 6/1970 | Alwall et al. | 210—321 |
| 3,522,885 | 8/1970 | Lavender et al. | 210—321 |

FOREIGN PATENTS 1,300,140  6/1962  France.

OTHER REFERENCES

Transactions American Society for Artificial Internal organs, vol. 12.

FRANK A. SPEAR, JR., Primary Examiner

U.S. Cl. X.R.

210—321, 335, 494

PO-1050
(5/69)

UNITED STATES PATENT OFFICE
CERTIFICATE OF CORRECTION

Patent No. 3,660,280      Dated May 2, 1972

Inventor(s) George Albert Rogers

It is certified that error appears in the above-identified patent and that said Letters Patent are hereby corrected as shown below:

Column 3, line 33, "patent" should read "patient"; delete lines 41, 42 and 43; line 50, at end of line delete "di-"; line 51, delete "alysing liquid through the". Column 4, after line 28, insert --let 10 of the envelope 2 of the dialysis unit 10 to waste.--

Signed and sealed this 5th day of September 1972.

(SEAL)
Attest:

EDWARD M. FLETCHER, JR.
Attesting Officer

ROBERT GOTTSCHALK
Commissioner of Patents